United States Patent
Dobai

(10) Patent No.: US 11,049,662 B2
(45) Date of Patent: Jun. 29, 2021

(54) ELECTROLYTIC CAPACITOR

(71) Applicant: TDK Electronics AG, Munich (DE)

(72) Inventor: Laszlo Dobai, Szeleste (HU)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/648,476

(22) PCT Filed: Sep. 28, 2018

(86) PCT No.: PCT/EP2018/076493
§ 371 (c)(1),
(2) Date: Mar. 18, 2020

(87) PCT Pub. No.: WO2019/076611
PCT Pub. Date: Apr. 25, 2019

(65) Prior Publication Data
US 2020/0251287 A1 Aug. 6, 2020

(30) Foreign Application Priority Data

Oct. 17, 2017 (DE) .................... 102017124139.6

(51) Int. Cl.
| | |
|---|---|
| *H01G 9/15* | (2006.01) |
| *H01G 11/48* | (2013.01) |
| *H01G 9/042* | (2006.01) |
| *H01G 9/00* | (2006.01) |
| *H01G 9/045* | (2006.01) |
| *H01G 11/60* | (2013.01) |
| *H01G 11/62* | (2013.01) |

(52) U.S. Cl.
CPC ......... *H01G 9/0425* (2013.01); *H01G 9/0036* (2013.01); *H01G 9/045* (2013.01); *H01G 9/151* (2013.01); *H01G 11/48* (2013.01); *H01G 11/60* (2013.01); *H01G 11/62* (2013.01)

(58) Field of Classification Search
CPC .... H01G 9/0425; H01G 9/0036; H01G 9/045; H01G 9/151; H01G 11/48; H01G 11/60; H01G 11/62
See application file for complete search history.

(56) References Cited

U.S. PATENT DOCUMENTS

| | | | | |
|---|---|---|---|---|
| 4,942,501 A | * | 7/1990 | MacFarlane | H01G 9/025 361/523 |
| 5,473,503 A | * | 12/1995 | Sakata | H01G 9/028 361/525 |

(Continued)

FOREIGN PATENT DOCUMENTS

| | | |
|---|---|---|
| CN | 101271769 A | 9/2008 |
| CN | 101894684 A | 11/2010 |

(Continued)

*Primary Examiner* — Dion Ferguson
(74) *Attorney, Agent, or Firm* — Slater Matsil, LLP

(57) ABSTRACT

An electrolytic capacitor is disclosed. In an embodiment an electrolytic capacitor includes an anode foil, a cathode foil, a working electrolyte arranged between the anode foil and the cathode foil, a polymer layer arranged on the anode foil, wherein the polymer layer comprises PEDOT:PSS and an intermediate electrolyte arranged between the polymer layer and the working electrolyte, wherein the intermediate electrolyte is different from the working electrolyte with respect to its composition.

18 Claims, 9 Drawing Sheets

(56) References Cited

U.S. PATENT DOCUMENTS

| | | | |
|---|---|---|---|
| 5,748,439 A * | 5/1998 | MacFarlane | H01G 9/02 |
| | | | 361/502 |
| 6,307,735 B1 | 10/2001 | Saito et al. | |
| 7,460,356 B2 | 12/2008 | Ning | |
| 8,462,484 B2 | 6/2013 | Kakuma et al. | |
| 9,208,954 B2 * | 12/2015 | Matsuura | H01G 11/60 |
| 9,972,445 B2 | 5/2018 | Koseki et al. | |
| 10,068,713 B2 * | 9/2018 | Andoralov | H01G 11/30 |
| 10,074,490 B2 * | 9/2018 | Chacko | H01G 9/035 |
| 2008/0316680 A1 * | 12/2008 | Iida | H01G 9/025 |
| | | | 361/523 |
| 2009/0021894 A1 * | 1/2009 | Ning | H01G 11/52 |
| | | | 361/527 |
| 2010/0297340 A1 | 11/2010 | Suzuki et al. | |
| 2011/0051323 A1 | 3/2011 | Ning et al. | |
| 2015/0187496 A1 | 7/2015 | Chien et al. | |
| 2016/0379760 A1 * | 12/2016 | Wright | H01G 9/06 |
| | | | 361/525 |
| 2018/0047521 A1 * | 2/2018 | Tsuda | H01G 9/151 |
| 2018/0277312 A1 * | 9/2018 | Tsubaki | H01G 11/86 |
| 2018/0323015 A1 * | 11/2018 | Andoralov | H01G 11/48 |

FOREIGN PATENT DOCUMENTS

| | | |
|---|---|---|
| CN | 104919555 A | 9/2015 |
| DE | 10104714 C1 | 7/2002 |
| DE | 10201267 C1 | 4/2003 |
| EP | 0538615 A2 | 4/1993 |
| GB | 2447724 A | 9/2008 |
| JP | H05234411 A | 9/1993 |
| WO | 8808612 A1 | 11/1988 |

* cited by examiner

FIG 3

| | FIG 3Aa | FIG 3Ab |
|---|---|---|
| | FIG 3Ba | FIG 3Bb |
| | FIG 3Ca | FIG 3Cb |

FIG 3Aa

| Intervall Messung | 100,0 | | | | 120,0 | | | 1000,0 | | |
|---|---|---|---|---|---|---|---|---|---|---|
| | C [μF] | ESR [mOhm] | Z [mOhm] | C [μF] | ESR [mOhm] | Z [mOhm] | C [μF] | ESR [mOhm] | Z [mOhm] | |
| 0,0 | 89,5 | 207,3 | 17786,2 | 89,4 | 176,7 | 14839,2 | 88,0 | 37,3 | 1808,5 | 87,4 | 16,8 | 183,1 |
| 500,0 | 88,3 | 185,1 | 18026,0 | 88,2 | 158,0 | 15036,9 | 87,1 | 34,0 | 1827,7 | 86,2 | 17,0 | 185,3 |
| 1000,0 | 88,2 | 189,7 | 18044,3 | 88,1 | 162,0 | 15052,8 | 87,0 | 35,0 | 1830,4 | 86,1 | 17,4 | 185,7 |
| 2000,0 | 88,0 | 190,8 | 18084,0 | 87,9 | 163,2 | 15086,0 | 86,8 | 35,8 | 1834,8 | 85,8 | 17,6 | 186,4 |
| 3000,0 | 87,7 | 197,6 | 18141,7 | 87,6 | 168,5 | 15134,6 | 86,4 | 39,3 | 1842,3 | 85,3 | 20,1 | 187,6 |
| 0 Std. | | | | | | | | | | 10000,0 | | |
| 4852/END/01 | 89,4 | 208,4 | 17803,2 | 89,3 | 178,3 | 14853,4 | 87,9 | 38,6 | 1810,5 | 87,4 | 17,7 | 183,0 |
| 4852/END/02 | 89,4 | 208,6 | 17797,8 | 89,3 | 178,2 | 14848,6 | 88,0 | 37,3 | 1809,7 | 87,0 | 16,6 | 183,6 |
| 4852/END/03 | 89,6 | 204,9 | 17757,8 | 89,5 | 173,7 | 14815,5 | 88,2 | 36,1 | 1805,2 | 87,5 | 16,1 | 182,7 |
| Minimum | 89,4 | 204,9 | 17757,8 | 89,3 | 173,7 | 14815,5 | 87,9 | 36,1 | 1805,2 | 87,0 | 16,1 | 182,7 |
| Maximum | 89,6 | 208,6 | 17803,2 | 89,5 | 178,3 | 14853,4 | 88,2 | 38,6 | 1810,5 | 87,5 | 17,7 | 183,6 |
| Mittelwert | 89,5 | 207,3 | 17786,2 | 89,4 | 176,7 | 14839,2 | 88,0 | 37,3 | 1808,5 | 87,3 | 16,8 | 183,1 |
| Stdev | 0,1 | 2,1 | 24,8 | 0,1 | 2,6 | 20,6 | 0,2 | 1,3 | 2,9 | 0,3 | 0,8 | 0,5 |

FIG 3Ba

| 500 Std. | 100,0 | | | 120,0 | | | 1000,0 | | | 10000,0 | | |
|---|---|---|---|---|---|---|---|---|---|---|---|---|
| | C [µF] | ESR [mOhm] | Z [mOhm] | C [µF] | ESR [mOhm] | Z [mOhm] | C [µF] | ESR [mOhm] | Z [mOhm] | C [µF] | ESR [mOhm] | Z [mOhm] |
| 4852/END/01 | 88,3 | 185,6 | 18029,0 | 88,2 | 158,4 | 15039,5 | 87,1 | 34,0 | 1827,8 | 86,2 | 17,1 | 185,4 |
| 4852/END/02 | 88,2 | 185,6 | 18053,2 | 88,1 | 158,7 | 15059,6 | 86,9 | 34,6 | 1830,8 | 86,0 | 17,2 | 185,8 |
| 4852/END/03 | 88,4 | 184,1 | 17995,9 | 88,4 | 156,8 | 15011,8 | 87,3 | 33,2 | 1824,4 | 86,5 | 16,8 | 184,7 |
| Minimum | 88,2 | 184,1 | 17995,9 | 88,1 | 156,8 | 15011,8 | 86,9 | 33,2 | 1824,4 | 86,0 | 16,8 | 184,7 |
| Maximum | 88,4 | 185,6 | 18053,2 | 88,4 | 158,7 | 15059,6 | 87,3 | 34,6 | 1830,8 | 86,5 | 17,2 | 185,8 |
| Mittelwert | 88,3 | 185,1 | 18026,0 | 88,2 | 158,0 | 15036,9 | 87,1 | 34,0 | 1827,7 | 86,2 | 17,0 | 185,3 |
| Stdev | 0,1 | 0,9 | 28,7 | 0,2 | 1,0 | 24,0 | 0,2 | 0,7 | 3,2 | 0,3 | 0,2 | 0,5 |

| 1000 Std. | 100,0 | | | 120,0 | | | 1000,0 | | | 10000,0 | | |
|---|---|---|---|---|---|---|---|---|---|---|---|---|
| | C [µF] | ESR [mOhm] | Z [mOhm] | C [µF] | ESR [mOhm] | Z [mOhm] | C [µF] | ESR [mOhm] | Z [mOhm] | C [µF] | ESR [mOhm] | Z [mOhm] |
| 4852/END/01 | 88,2 | 190,6 | 18044,3 | 88,1 | 162,5 | 15052,9 | 87,0 | 35,0 | 1830,2 | 86,1 | 17,5 | 185,7 |
| 4852/END/02 | 88,1 | 190,4 | 18074,4 | 88,0 | 162,8 | 15077,9 | 86,8 | 35,7 | 1833,9 | 85,8 | 17,5 | 186,3 |
| 4852/END/03 | 88,4 | 188,2 | 18014,1 | 88,3 | 160,8 | 15027,6 | 87,1 | 34,2 | 1827,0 | 86,4 | 17,3 | 185,1 |
| Minimum | 88,1 | 188,2 | 18014,1 | 88,0 | 160,8 | 15027,6 | 86,8 | 34,2 | 1827,0 | 85,8 | 17,3 | 185,1 |
| Maximum | 88,4 | 190,6 | 18074,4 | 88,3 | 162,8 | 15077,9 | 87,1 | 35,7 | 1833,9 | 86,4 | 17,5 | 186,3 |
| Mittelwert | 88,2 | 189,7 | 18044,3 | 88,1 | 162,0 | 15052,8 | 87,0 | 35,0 | 1830,4 | 86,1 | 17,4 | 185,7 |
| Stdev | 0,2 | 1,3 | 30,1 | 0,2 | 1,1 | 25,2 | 0,2 | 0,7 | 3,5 | 0,3 | 0,1 | 0,6 |

FIG 3Bb

| C [μF] | ESR [mOhm] | Z [mOhm] | C [μF] | ESR [mOhm] | Z [mOhm] | Gewählt fr | | Gewählt fr | LC [μA] | | | W [g] |
|---|---|---|---|---|---|---|---|---|---|---|---|---|
| 20000,0 | | | 100000,0 | | | DeltaC/C | Tan | | LC_1MIN | LC_2MIN | LC_5MIN | |
| 87,8 | 16,1 | 92,1 | 222,0 | 17,6 | 19,0 | -1,2 | 1,1 | | 4,3 | 2,1 | 1,0 | 21,9 |
| 87,6 | 16,2 | 92,3 | 225,3 | 17,8 | 19,2 | -1,3 | 1,1 | | 4,5 | 2,3 | 1,1 | 21,8 |
| 88,1 | 16,0 | 91,7 | 222,5 | 17,5 | 18,9 | -1,2 | 1,0 | | 4,4 | 2,3 | 1,1 | 21,7 |
| 87,6 | 16,0 | 91,7 | 222,0 | 17,5 | 18,9 | -1,3 | 1,0 | | 4,3 | 2,1 | 1,0 | 21,7 |
| 88,1 | 16,2 | 92,3 | 225,3 | 17,8 | 19,2 | -1,2 | 1,1 | | 4,5 | 2,3 | 1,1 | 21,9 |
| 87,8 | 16,1 | 92,0 | 223,3 | 17,7 | 19,1 | -1,3 | 1,1 | | 4,4 | 2,2 | 1,1 | 21,8 |
| 0,3 | 0,1 | 0,3 | 1,8 | 0,2 | 0,1 | 0,1 | 0,0 | | 0,1 | 0,1 | 0,1 | 0,1 |

| C [μF] | ESR [mOhm] | Z [mOhm] | C [μF] | ESR [mOhm] | Z [mOhm] | Gewählt fr | | Gewählt fr | LC [μA] | | | W [g] |
|---|---|---|---|---|---|---|---|---|---|---|---|---|
| 20000,0 | | | 100000,0 | | | DeltaC/C | Tan | | LC_1MIN | LC_2MIN | LC_5MIN | |
| 87,8 | 16,5 | 92,2 | 234,8 | 18,2 | 19,4 | -1,3 | 1,1 | | 4,0 | 1,8 | 1,0 | 21,9 |
| 87,5 | 16,5 | 92,5 | 230,7 | 18,1 | 19,3 | -1,5 | 1,1 | | 10,1 | 7,1 | 2,4 | 21,8 |
| 88,1 | 16,4 | 91,8 | 231,1 | 18,1 | 19,4 | -1,3 | 1,1 | | 4,1 | 1,9 | 0,9 | 21,6 |
| 87,5 | 16,4 | 91,8 | 230,7 | 18,1 | 19,3 | -1,5 | 1,1 | | 4,0 | 1,8 | 0,9 | 21,6 |
| 88,1 | 16,5 | 92,5 | 234,8 | 18,2 | 19,4 | -1,3 | 1,1 | | 10,1 | 7,1 | 2,4 | 21,9 |
| 87,8 | 16,5 | 92,2 | 232,2 | 18,1 | 19,4 | -1,4 | 1,1 | | 6,1 | 3,6 | 1,4 | 21,8 |
| 0,3 | 0,0 | 0,3 | 2,3 | 0,1 | 0,1 | 0,1 | 0,0 | | 3,5 | 3,0 | 0,8 | 0,1 |

FIG 3Ca

| 2000 Std. | 100,0 | | 120,0 | | 1000,0 | | 10000,0 | |
|---|---|---|---|---|---|---|---|---|
| | C [µF] | ESR [mOhm] | Z [mOhm] | C [µF] | ESR [mOhm] | Z [mOhm] | C [µF] | ESR [mOhm] | Z [mOhm] | C [µF] | ESR [mOhm] | Z [mOhm] |
| 4852/END/01 | 88,0 | 191,2 | 18086,1 | 87,9 | 163,3 | 15087,6 | 86,8 | 36,0 | 1834,8 | 85,7 | 17,6 | 186,5 |
| 4852/END/02 | 87,9 | 192,5 | 18114,7 | 87,8 | 165,0 | 15111,8 | 86,6 | 36,5 | 1838,5 | 85,6 | 17,7 | 186,9 |
| 4852/END/03 | 88,2 | 188,9 | 18051,1 | 88,1 | 161,5 | 15058,5 | 86,9 | 34,9 | 1830,9 | 86,0 | 17,5 | 185,8 |
| Minimum | 87,9 | 188,9 | 18051,1 | 87,8 | 161,5 | 15058,5 | 86,6 | 34,9 | 1830,9 | 85,6 | 17,5 | 185,8 |
| Maximum | 88,2 | 192,5 | 18114,7 | 88,1 | 165,0 | 15111,8 | 86,9 | 36,5 | 1838,5 | 86,0 | 17,7 | 186,9 |
| Mittelwert | 88,0 | 190,8 | 18084,0 | 87,9 | 163,2 | 15086,0 | 86,8 | 35,8 | 1834,8 | 85,8 | 17,6 | 186,4 |
| Stdev | 0,2 | 1,8 | 31,9 | 0,2 | 1,7 | 26,7 | 0,2 | 0,8 | 3,8 | 0,2 | 0,1 | 0,5 |

| 3000 Std. | 100,0 | | | 120,0 | | | 1000,0 | | | 10000,0 | | |
|---|---|---|---|---|---|---|---|---|---|---|---|---|
| | C [µF] | ESR [mOhm] | Z [mOhm] | C [µF] | ESR [mOhm] | Z [mOhm] | C [µF] | ESR [mOhm] | Z [mOhm] | C [µF] | ESR [mOhm] | Z [mOhm] |
| 4852/END/01 | 87,7 | 200,3 | 18144,0 | 87,6 | 171,4 | 15136,2 | 86,4 | 42,8 | 1842,6 | 85,5 | 23,3 | 187,5 |
| 4852/END/02 | 87,6 | 200,7 | 18175,1 | 87,5 | 171,0 | 15163,0 | 86,2 | 38,7 | 1845,6 | 85,0 | 18,8 | 188,2 |
| 4852/END/03 | 87,9 | 191,8 | 18106,0 | 87,8 | 163,0 | 15104,7 | 86,6 | 36,3 | 1837,7 | 85,4 | 18,1 | 187,2 |
| Minimum | 87,6 | 191,8 | 18106,0 | 87,5 | 163,0 | 15104,7 | 86,2 | 36,3 | 1837,7 | 85,0 | 18,1 | 187,2 |
| Maximum | 87,9 | 200,7 | 18175,1 | 87,8 | 171,4 | 15163,0 | 86,6 | 42,8 | 1846,6 | 85,5 | 23,3 | 188,2 |
| Mittelwert | 87,7 | 197,6 | 18141,7 | 87,6 | 168,5 | 15134,6 | 86,4 | 39,3 | 1842,3 | 85,3 | 20,1 | 187,6 |
| Stdev | 0,2 | 5,0 | 34,6 | 0,2 | 4,7 | 29,2 | 0,2 | 3,3 | 4,5 | 0,3 | 2,8 | 0,5 |

FIG 3Cb

| 20000,0 | | | 100000,0 | | | Gewählt fr | Gewählt fr | LC [µA] | | | |
|---|---|---|---|---|---|---|---|---|---|---|---|
| C [µF] | ESR [mOhm] | Z [mOhm] | C [µF] | ESR [mOhm] | Z [mOhm] | DeltaC/C | Tan | LC_1MIN | LC_2MIN | LC_5MIN | W [g] |
| 87,2 | 16,6 | 92,7 | 211,6 | 18,1 | 19,6 | -1,6 | 1,1 | 3,8 | 1,7 | 0,8 | 21,8 |
| 87,1 | 16,6 | 92,8 | 224,2 | 18,3 | 19,6 | -1,7 | 1,1 | 3,4 | 1,6 | 0,6 | 21,7 |
| 87,5 | 16,5 | 92,4 | 207,0 | 17,9 | 19,5 | -1,6 | 1,1 | 3,5 | 1,6 | 0,8 | 21,6 |
| 87,1 | 16,5 | 92,4 | 207,0 | 17,9 | 19,5 | -1,7 | 1,1 | 3,4 | 1,6 | 0,6 | 21,6 |
| 87,5 | 16,6 | 92,8 | 224,2 | 18,3 | 19,6 | -1,6 | 1,1 | 3,8 | 1,7 | 0,8 | 21,8 |
| 87,3 | 16,6 | 92,7 | 214,3 | 18,1 | 19,5 | -1,6 | 1,1 | 3,6 | 1,6 | 0,7 | 21,7 |
| 0,2 | 0,1 | 0,2 | 8,9 | 0,2 | 0,1 | 0,1 | 0,0 | 0,2 | 0,1 | 0,1 | 0,1 |

| 20000,0 | | | 100000,0 | | | Gewählt fr | Gewählt fr | LC [µA] | | | |
|---|---|---|---|---|---|---|---|---|---|---|---|
| C [µF] | ESR [mOhm] | Z [mOhm] | C [µF] | ESR [mOhm] | Z [mOhm] | DeltaC/C | Tan | LC_1MIN | LC_2MIN | LC_5MIN | W [g] |
| 87,8 | 22,4 | 93,4 | 382,9 | 24,7 | 25,1 | -1,9 | 1,1 | 3,6 | 1,8 | 0,7 | 21,7 |
| 86,4 | 17,5 | 93,7 | 217,3 | 18,8 | 20,1 | -2,0 | 1,1 | 3,2 | 1,7 | 0,7 | 21,7 |
| 86,8 | 16,9 | 93,2 | 202,4 | 17,9 | 19,6 | -1,9 | 1,1 | 3,4 | 1,8 | 0,8 | 21,5 |
| 86,4 | 16,9 | 93,2 | 202,4 | 17,9 | 19,6 | -2,0 | 1,1 | 3,2 | 1,7 | 0,7 | 21,5 |
| 87,8 | 22,4 | 93,7 | 382,9 | 24,7 | 25,1 | -1,9 | 1,1 | 3,6 | 1,8 | 0,8 | 21,7 |
| 87,0 | 18,9 | 93,5 | 267,5 | 20,5 | 21,6 | -1,9 | 1,1 | 3,4 | 1,8 | 0,7 | 21,6 |
| 0,7 | 3,0 | 0,2 | 100,2 | 3,7 | 3,0 | 0,1 | 0,0 | 0,2 | 0,1 | 0,1 | 0,1 |

| FIG 4A | FIG 4B |

| Konventional Kondensators | 100 Hz | | | 120 Hz | | | 1 kHz | | |
|---|---|---|---|---|---|---|---|---|---|
| Nr. | C [μF] | ESR [mOhm] | Z [mOhm] | C [μF] | ESR [mOhm] | Z [mOhm] | C [μF] | ESR [mOhm] | Z [mOhm] |
| ALU ELKO Std. 1 | 89,7 | 320,3 | 17746,2 | 89,6 | 289,0 | 14806,5 | 88,4 | 147,5 | 1807,1 |
| ALU ELKO Std. 2 | 89,3 | 326,0 | 17825,7 | 89,2 | 295,3 | 14873,9 | 88,0 | 151,7 | 1815,7 |
| ALU ELKO Std. 3 | 89,6 | 326,4 | 17767,5 | 89,5 | 295,3 | 14823,9 | 88,2 | 153,0 | 1810,1 |

| Hybrid Polymer Kondensators | 100 Hz | | | 120 Hz | | | 1 kHz | | |
|---|---|---|---|---|---|---|---|---|---|
| Nr. | C [μF] | ESR [mOhm] | Z [mOhm] | C [μF] | ESR [mOhm] | Z [mOhm] | C [μF] | ESR [mOhm] | Z [mOhm] |
| Hybrid Polymer ELKO 1 | 89,4 | 208,4 | 17803,2 | 89,3 | 178,3 | 14853,4 | 87,9 | 38,6 | 1810,5 |
| Hybrid Polymer ELKO 2 | 89,4 | 208,6 | 17797,8 | 89,3 | 178,2 | 14848,6 | 88,0 | 37,3 | 1809,7 |
| Hybrid Polymer ELKO 3 | 89,6 | 204,9 | 17757,8 | 89,5 | 173,7 | 14815,5 | 88,2 | 36,1 | 1805,2 |

FIG 4B

| | 10 kHz | | | 20 kHz | | | 100 kHz | | |
|---|---|---|---|---|---|---|---|---|---|
| C [µF] | ESR [mOhm] | Z [mOhm] | C [µF] | ESR [mOhm] | Z [mOhm] | C [µF] | ESR [mOhm] | Z [mOhm] |
| 86,5 | 129,8 | 225,1 | 86,4 | 127,4 | 157,2 | 156,2 | 124,3 | 124,7 |
| 86,1 | 133,5 | 227,9 | 86,2 | 131,2 | 160,4 | 172,0 | 128,5 | 128,9 |
| 86,4 | 134,7 | 228,2 | 86,5 | 132,4 | 161,2 | 179,6 | 129,7 | 130,0 |

⇨ ⇨ ⇨

| | 10 kHz | | | 20 kHz | | | 100 kHz | | |
|---|---|---|---|---|---|---|---|---|---|
| C [µF] | ESR [mOhm] | Z [mOhm] | C [µF] | ESR [mOhm] | Z [mOhm] | C [µF] | ESR [mOhm] | Z [mOhm] |
| 87,4 | 17,7 | 183,0 | 90,1 | 17,3 | 90,0 | 437,2 | 20,7 | 21,0 |
| 87,0 | 16,6 | 183,6 | 88,8 | 15,8 | 91,0 | 229,2 | 17,6 | 19,0 |
| 87,5 | 16,1 | 182,7 | 89,4 | 15,6 | 90,4 | 234,7 | 17,9 | 19,1 |

ELECTROLYTIC CAPACITOR

This patent application is a national phase filing under section 371 of PCT/EP2018/076493, filed Sep. 28, 2018, which claims the priority of German patent application 102017124139.6, filed Oct. 17, 2017, each of which is incorporated herein by reference in its entirety.

TECHNICAL FIELD

The present invention concerns an electrolytic capacitor. In particular, the present invention concerns a hybrid polymer electrolytic capacitor.

BACKGROUND

U.S. Pat. No. 8,462,484 B2 discloses a hybrid polymer capacitor comprising a working electrolyte based on γ-butyrolactone (GBL) and/or sulfolane solvents. The capacitor having a working electrolyte based on GBL and/or sulfolane solvents is limited to a working voltage of no more than 120 V as GBL and sulfolane solvents have a limited oxidizing capability. Accordingly, they cannot generate oxide layers that are thick enough to withstand working voltages higher than 120 V.

Moreover, γ-butyrolactone and sulfolane solvents have other disadvantageous. From environmental and human safety points, these solvents are dangerous as GBL is a psychoactive substance and sulfolane is reprotoxic. Nevertheless, these materials are commonly used as they do no damage, hurt or degrade polymer layers based on PEDOT:PSS (poly(3,4-ethylenedioxythiophene) polystyrene sulfonate).

SUMMARY OF THE INVENTION

Embodiments provide an improved hybrid electrolytic polymer capacitor. In particular, embodiments overcome at least some of the above mentioned disadvantages and/or to enable higher working voltages.

An electrolytic capacitor is provided which comprises an anode foil and a cathode foil wherein a working electrolyte is arranged between the anode foil and the cathode foil, wherein a polymer layer is arranged on the surface of the anode foil and wherein an intermediate electrolyte is arranged between the polymer layer and the working electrolyte.

The intermediate electrolyte may be a conductive, viscous material which is arranged between the polymer layer and the working electrolyte. The intermediate electrolyte may abut the polymer layer. The intermediate electrolyte may abut the working electrolyte. The intermediate electrolyte may be different from the working electrolyte with respect to its composition.

The intermediate electrolyte may prevent that too much of the working electrolyte gets in contact with the polymer layer, thereby the intermediate electrolyte may prevent the working electrolyte from damaging, degrading or swelling the polymer layer. Accordingly, the use of the intermediate electrolyte may enable the use of materials for the working electrolyte other than GBL and sulfolane solvents. As the intermediate electrolyte is arranged between the working electrolyte and the polymer layer, more aggressive materials can be used for the working electrolyte. Thus, the construction of a capacitor is enabled which can withstand higher working voltages. In particular, the electrolytic capacitor may be operable at working voltages up to 450 V.

The working electrolyte may also be a conductive, viscous material. A voltage may be applied to the working electrolyte via the cathode foil. The working electrolyte may act as a second electrode of the capacitor.

The polymer layer may also be arranged on the cathode foil. The cathode foil can be oxidized. Accordingly, the cathode foil may have an artificially formed oxide layer. The oxide layer may be thicker than a natural oxide having a thickness of 2 nm to 3 nm. The polymer layer may also be formed on a separator.

The working electrolyte and the intermediate electrolyte may differ in their composition. For example, the working electrolyte may comprise ethylene glycol and the intermediate electrolyte may be free from ethylene glycol. In this case, the intermediate electrolyte being free from ethylene glycol may ensure that the polymer is not damaged by ethylene glycol. At the same time, the working electrolyte comprising ethylene glycol may ensure that the advantageous properties of ethylene glycol can be exploited.

The intermediate electrolyte may comprise polyol and a conducting salt. The conducting salt may ensure that the intermediate electrolyte is conductive.

The polyol can be glycerol, sugar alcohol and polyvinyl alcohol. The polyol can also be a mixture of glycerol, sugar alcohol and/or polyvinyl alcohol. The sugar alcohol may for example, be sorbitol. These material can ensure that the intermediate electrolyte is stable enough with the polymer layer and at the same time enable an oxidization of the polymer layer.

An amount of the polyol in the intermediate electrolyte may be in the range of 3 weight-% to 80 weight-%.

The conducting salt may contain at least one of carboxylic acid and/or dicarboxylic acid as anions and at least one of ammonium and/or amines as cations. The dicarboxylic acid may be adipic acid. The carboxylic acid may be benzoic acid.

An amount of the conducting salt in the intermediate electrolyte may be in the range of 0.01 weight-% to 8 weight-%. The amount of the conducting salt should not be lower than 0.01 weight-% as, otherwise, the intermediate electrolyte may not be sufficiently conductive.

The intermediate electrolyte may comprise diethylene glycol in the range of 1 weight-% to 40 weight-% and/or propylene glycol in the range of 1 weight-% to 40 weight-%.

The working electrolyte may comprise a solvent and at least 0.01 weight-% conducting salt.

The solvent may contain at least one of ethylene glycol, diethylene glycol and propylene glycol. A working electrolyte containing at least one of ethylene glycol, diethylene glycol and propylene glycol is also referred to as a working electrolyte of a second group in the present application. A working electrolyte containing at least one of ethylene glycol, diethylene glycol and propylene glycol has a better oxidizing capability than a working electrolyte based on GBL and/or sulfolane. Thus, the working electrolyte containing at least one of ethylene glycol, diethylene glycol and propylene glycol enables to operate the capacitor at a high operating voltage, e.g., at a voltage up to 450 V.

The conducting salt in the working electrolyte may contain at least one of carboxylic acid, dicarboxylic acid, ammonium and aromatic nitro compounds with one or more nitro groups. Dicarboxylic acid may be adipic acid. The carboxylic acid may be benzoic acid.

The working electrolyte may comprise a polyol solved in the solvent wherein the polyol may be one of glycerol, sugar alcohol and a polyvinyl alcohol or a mixture of glycerol, sugar alcohol and/or a polyvinyl alcohol. The sugar alcohol may be sorbitol or mannitol.

The working electrolyte may comprise at least one of polyethylene glycol, a polyvinylpirrolidone and polyalkylene glycol and/or derivatives from polyalkylene glycol.

The working electrolyte may comprise:
a) 40-85 weight-% ethylene glycol;
b) 0.001-5.0 weight-% p-nitrobenzoic acid;
c) 0.001-0.5 weight-% ammonium hypophosphite;
d) 1-10 weight-% ammonium pentaborate;
e) 1-10 weight-% polyethylene glycol;
f) 10-50 weight-% of a composition comprising diammonium salt of 2-methyl-nonandi acid, 2,4-dimethyl-4-methoxy-carbonyl-undecandi acid, 2,4,6-trimethyl-4,6-dimethoxy-carbonyl-tridecandi acid und 8,9-dimethyl-8,9-dimethoxy-carbonyl-hexadecandie acid; and
g) 1-10 weight-% ammonium-methylbenzoat.

The polymer layer may comprise PEDOT:PSS PEDOT:PSS (poly(3,4-ethylenedioxythiophene) polystyrene sulfonate). PEDOT:PSS is a polymer mixture which is conductive and provides a high ductility.

However, PEDOT:PSS polymers can react with some solvents used in electrolytes. Such a reaction may result in the polymer layer being detached from the surface of the anode foil. This would result in decreasing the conductivity of the polymer layer, thereby increasing its ESR value (equivalent serial resistance). The intermediate electrolyte arranged between a working electrolyte and the polymer layer prevents the working electrolyte from significantly damaging the polymer layer, thus preventing a reduction of the ESR value of the electrolytic capacitor.

According to an alternative embodiment, the working electrolyte contains γ-butyrolactone and/or sulfolane. In this alternative embodiment, the capacitor comprises the intermediate electrolyte and the working electrolyte based on γ-butyrolactone and/or sulfolane. Thus, the polymer layer is very well protected as GBL and sulfolane do not damage the polymer layer to a significant extent and the intermediate electrolyte provides an even further protection of the polymer layer.

The cathode foil may comprise an oxide layer on a surface facing towards the working electrolyte. The oxide layer may have a thickness in the range of 1 nm to 10 nm.

According to another embodiment an electrolytic capacitor which does not comprise an intermediate electrolyte is disclosed. The electrolytic capacitor comprises an anode foil and a cathode foil, wherein a working electrolyte is arranged between the anode foil and the cathode foil, wherein a polymer layer is arranged on the anode foil, and wherein the working electrolyte comprises at least one of ethylene glycol, diethylene glycol and propylene glycol. This capacitor can also be operated at working voltages of up to 450 V. However, due to the missing intermediate electrolyte, the working electrolyte may damage the polymer layer after a short time. Thus, the lifetime of the capacitor is very limited. The capacitor can only be operated for a short lifetime, e.g., for a lifetime of approximately 500 hours. For some applications, the advantage of a high working voltage 450 V is more important than a limitation in the lifetime.

The working electrolyte may further comprises at least 0.01 weight-% conducting salt.

BRIEF DESCRIPTION OF THE DRAWINGS

In the following, the present invention is described in more detail with reference to the figures.

DETAILED DESCRIPTION OF ILLUSTRATIVE EMBODIMENTS

Figure 1:
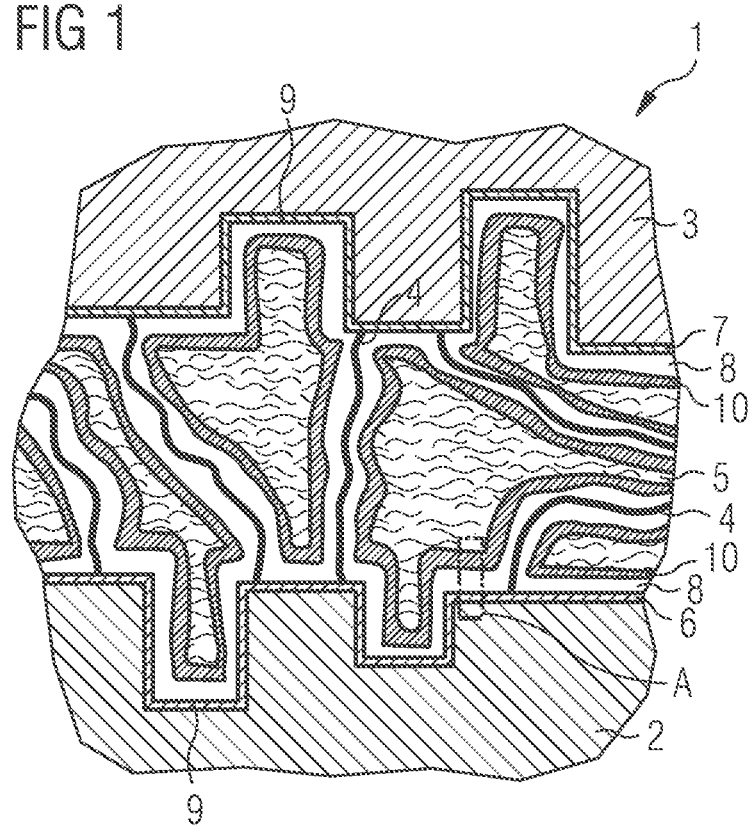
FIG. 1 shows a structure of an electrolytic capacitor in a schematic view.

FIG. 1 shows a structure of an electrolytic capacitor 1 in a schematic view. FIG. 1 represents a purely schematic drawing which is not true to scale. The electrolytic capacitor 1 is a hybrid polymer capacitor.

The electrolytic capacitor 1 comprises an anode foil 2 and a cathode foil 3 which are wound to form a winding body. The anode foil 2 and the cathode foil 3 may comprise aluminum or consist of aluminum.

The anode foil 2 has a so-called etched-structure. Thus, pits 9 are formed in a surface of the anode foil 2. Further, pits 9 are also formed in a surface of the cathode foil 3.

The surface of the anode foil 2 facing towards the cathode foil 3 has been oxidized. Thus, an oxide layer 6 is formed on the surface of the anode foil 2 facing towards the cathode foil 3. The oxide layer 6 may have a thickness in a range from 50 nm to 700 nm. The oxide layer 6 acts as the dielectric of the electrolytic capacitor.

Further, a surface of the cathode foil 3 facing towards the anode foil 2 may also be oxidized. Thus, an oxide layer 7 is formed on the surface of the cathode foil 3 facing towards the anode foil 2. The oxide layer 7 on the surface of the cathode foil 3 may be thinner than the oxide layer 6 on the surface of the anode foil. The oxide layer 7 formed on the surface of the cathode foil may have a thickness in the range from 1 nm to 10 nm. In an alternative embodiment, no oxide layer 7 is formed on the cathode foil 3. An oxide layer 7 on the cathode foil 3 having a thickness in the range of 1-10 nm helps to stabilize the surface and protects the surface against hydration.

A separator 4 is arranged between the cathode foil 3 and the anode foil 2. The separator 4 is a fiber. In particular, the separator 4 may be a paper fiber. The separator 4 can be in direct contact with the anode foil 2 and/or the cathode foil 3.

A polymer layer 8 is arranged on the anode foil 2, the cathode foil 3 and the separator 4. In particular, the polymer layer 8 is arranged on the surface of the anode foil 2 which faces towards the cathode foil 3. In particular, the polymer layer 8 is arranged on the oxide layer 6 which is formed on the anode foil 2.

The polymer layer 8 comprises PEDOT:PSS (poly(3,4-ethylenedioxythiophene) polystyrene sulfonate). PEDOT:PSS is a polymer mixture which is conductive and provides a high ductility.

However, PEDOT:PSS polymers can react with some solvents used in electrolytes. Such a reaction may result in the polymer layer 8 being detached from the surface of the anode foil 2 or from the surface of the cathode foil 3. This would result in decreasing the conductivity of the electrolytic capacitor 1, thereby increasing its ESR value (equivalent serial resistance). As will be explained in more detail later, the use of an intermediate electrolyte 10 between a working electrolyte 5 and the polymer layer 8 prevents the working electrolyte 5 from significantly damaging the polymer layer 8, thus preventing a reduction of the ESR value of the electrolytic capacitor 1.

As mentioned above, the electrolytic capacitor 1 comprises the intermediate electrolyte 10 and the working electrolyte 5. A potential can be applied to the working electrolyte 5 via the cathode foil 3. The working electrolyte serves in principle as the second electrode of the capacitor.

The intermediate electrolyte 10 is arranged between the polymer layer 8 and the working electrolyte 5. In particular, the intermediate electrolyte 10 is arranged between the polymer layer 8 on the surface of the anode foil 2 and the working electrolyte 5. Further, the intermediate electrolyte 10 is also arranged between the working electrolyte 10 and the polymer layer 8 on the cathode foil 3. The intermediate electrolyte 10 is also arranged between the working electrolyte 10 and the polymer layer 8 on the separator 4.

The intermediate electrolyte 10 can be absorbed in the winding body. Thus, at least to 2 to 60 weight-% of the dry winding body can be covered by the intermediate electrolyte 10. In particular, the intermediate electrolyte 10 may cover the anode foil 2, the cathode foil 3, the separator 4 and tap foils which are used to electrically contact the anode foil 2 and the cathode foil 3.

The working electrolyte 5 can also be absorbed in the winding body. Thus, at least to 2 to 60 weight-% of the dry winding body can be covered by the working electrolyte 5. In particular, the working electrolyte 5 may cover the anode foil 2, the cathode foil 3, the separator 4 and the taps which are used to electrically contact the anode foil 2 and the cathode foil 3.

Different compositions can be used as a working electrolyte 5. A first group of working electrolytes 5 is based on γ-butyrolactone (GBL) and/or sulfolane solvents. The first group of working electrolytes 5 provides the advantage that it does not attack, damage or swell the polymer layer 8. However, the working electrolytes 5 of the first group have a limited oxidizing capability. Thus, the working voltage of the electrolytic capacitor 1 is limited to no more than 120 V for capacitors using the first group of working electrolytes. The working electrolytes 5 of the first group cannot generate oxide layers 6 that are not thick enough to withstand higher working voltages.

A second group of working electrolytes 5 comprises a solvent and a conducting salt wherein the solvent contains at least one of ethylene glycol, diethylene glycol and propylene glycol. These solvents are not commonly used in a hybrid polymer capacitor as they may attack, damage or swell the PEDOT:PSS in the polymer layer 8. However, as the intermediate electrolyte 10 is arranged between the working electrolyte 5 and the polymer layer 8, the intermediate electrolyte 10 prevents the working electrolyte 5 from damaging the polymer layer 8. Thus, the arrangement of the intermediate electrolyte 10 between the working electrolyte 5 and the polymer layer 8 enables the use of working electrolytes 5 of the second group without damaging the polymer layer 8.

The working electrolyte 5 of the second group has an improved oxidizing capability over the working electrolyte 5 of the first group. Thus, a thicker oxide layer 6 is formed on the surface of the anode foil 2. Therefore, the electrolytic capacitors 1 can be operated at higher working voltages. In particular, the electrolytic capacitors 1 can be operated at a working voltage up to 450 V.

Moreover, the working electrolyte 5 of the second group provides further advantages. The use of harmful and toxic chemicals like γ-butyrolactone (GBL) and/or sulfolane solvents can be omitted. Moreover, the working electrolyte 5 of the second group results in lower ESR values at low temperatures compared to the working electrolytes of the first group, e.g., at temperatures of −55° C., −40° C. or −25° C. In particular, in a frequency range of 20 Hz to 500 Hz, the reduction in the ESR value at low temperatures for a working electrolyte 5 of the second group compared to a working electrolyte 5 of the first group is particularly strong.

The amount of the solvent in the working electrolyte 5 of the second group is in the range of 1 weight-% to 80 weight-%. In particular, the amount of ethylene glycol in the working electrolyte of the second group is in the range of 1 weight-% to 80 weight-%. Additionally or alternatively to ethylene glycol, the working electrolyte 5 may comprise diethylene glycol in the range of 1 weight-% to 60 weight-% and/or propylene glycol in the range of 1 weight-% to 60 weight-%.

The conducting salt of the working electrolyte 5 of the second group may comprise at least one of carboxylic acid, dicarboxylic acid, ammonium and aromatic nitro compounds with one or more nitro groups. Adipic acid is an example for a dicarboxylic acid used in the working electrolyte 5. The carboxylic acid may, for example, be benzoic acid. The amount of the conducting salt in the working electrolyte 5 may be in the range of 0.01 weight-% to 8 weight-%.

The working electrolyte 5 of the second group may further comprise other components, in particular at least one of glycerol, a sugar alcohol, for example, sorbitol or mannitol, and a polyvinyl alcohol (PVA). The working electrolyte 5 may also comprise at least one of polyethylene glycol, polyvinylpirrolidone and polyalkylene glycol and/or derivatives of polyalkylene glycol. The amount of polyalkylene glycol and/or derivatives of polyalkylene glycol in the working electrolyte 5 may be in the range of 1 weight-% to 80 weight-%. The amount of sugar alcohols in the working electrolyte 5 may be in the range of 1 weight-% to 30 weight-%.

In Table 1, three examples of compositions of the working electrolyte are given:

TABLE 1

|  | Example 1 | Example 2 | Example 3 |
| --- | --- | --- | --- |
| Ethylene glycol [weight-%] | 70 | 70 | 80 |
| Diethylene glycol [weight-%] | 10 | — | — |
| Propylene glycol [weight-%] | — | 10 | — |
| Benzoic acid [weight-%] | 7 | 7 | 7 |
| Adipic acid [weight-%] | 3 | 3 | 3 |
| Ammonia [weight-%] | 1 | 1 | 1 |
| p-nitrobenzoic acid [weight-%] | 1 | 1 | 1 |
| Mannitol [weight-%] | 5 | 5 | 5 |
| PEG 6000 [weight-%] | 3 | 3 | — |
| PVA [weight-%] | — | — | 3 |

The intermediate electrolyte 10 can protect the polymer layer 8 from being damaged by the working electrolyte 5. At the same time, the intermediate electrolyte 10 allows some of the working electrolyte 5 to penetrate through the intermediate electrolyte 10 and to enable an oxidization of the surface of the anode foil 2.

The intermediate electrolyte 10 comprises a polyol and a conducting salt. The polyol can be one of glycerol, sugar alcohol, for example, sorbitol, and a polyvinyl alcohol. The amount of the polyol in the intermediate electrolyte 10 is in the range of 3 weight-% to 80 weight-%. The amount of the conducting salt in the intermediate electrolyte 10 is in the range of 0.01 weight-% to 8 weight-%. The conducting salt contains at least one of carboxylic acid and/or dicarboxylic acid as anions and at least one of ammonium and/or amines as cations. The dicarboxylic acid may be adipic acid. The carboxylic acid may be benzoic acid.

Table 2 shows four examples of possible compositions of the intermediate electrolyte 10:

TABLE 2

|  | Example 1 | Example 2 | Example 3 | Example 4 |
|---|---|---|---|---|
| Propylene glycol [weight-%] | 20 | 20 | 5 | — |
| Diethylene glycol [weight-%] | 40 | 22 | 37 | 32 |
| Glycerol [weight-%] | 32 | 50 | 50 | 50 |
| Adipic acid [weight-%] | 0.1 | 0.1 | 0.1 | 0.1 |
| Ammonia [weight-%] | 0.1 | 0.1 | 0.1 | 0.1 |
| Sorbitol [weight-%] | 7.8 | 7.8 | 7.8 | 17.8 |

The use of the intermediate electrolyte 10 between the polymer layer 8 and the working electrolyte 5 ensures that the working electrolyte 5 does not damage the polymer layer 8. Thereby, the intermediate electrolyte 10 enables the use of a working electrolyte 5 of the second group without significantly reducing the lifetime of the capacitor 1. As discussed above, the working electrolytes 5 of the second group provide a high oxidizing capability, thereby enabling to operate the capacitor 1 at working voltages over 120 V. In particular, it is possible to operate the capacitor 1 at working voltages up to 450 V. The capacitor 1 provides a low ESR and is reliable at high temperatures, even at 125° C. or 150° C.

Moreover, the intermediate electrolyte 10 enables the use of less harmful and less toxic chemicals. Further, as will be shown later, in particular at low temperatures, the ESR value of the capacitor 1 is improved compared to capacitors operating with a working electrolyte 5 based on γ-butyrolactone and/or sulfolane solvents.

As discussed above, the intermediate electrolyte 10 contains conducting salt. The conduction salt can migrate to the surface of the anode foil 2. The conducting salt can oxidize the surface and, thereby, form the oxide layer 6. Further, an amount of the working electrolyte 5 can diffuse through the intermediate electrolyte 10 and can also oxidize the surface of the anode foil 2. Thus, the intermediate electrolyte 10 and the working electrolyte 5 contribute to the forming of the oxide layer 6. Accordingly, the thickness of the oxide layer 6, 7 is determined by both of the intermediate electrolyte 10 and the working electrolyte 5. As the intermediate electrolyte 10 covers the surface of the anode foil 2 facing to the cathode foil 3, the intermediate electrolyte 10 can ensure that the thickness of the oxide layer 6 is maintained throughout the lifetime of the electrolytic hybrid polymer capacitor 1.

Figure 2:
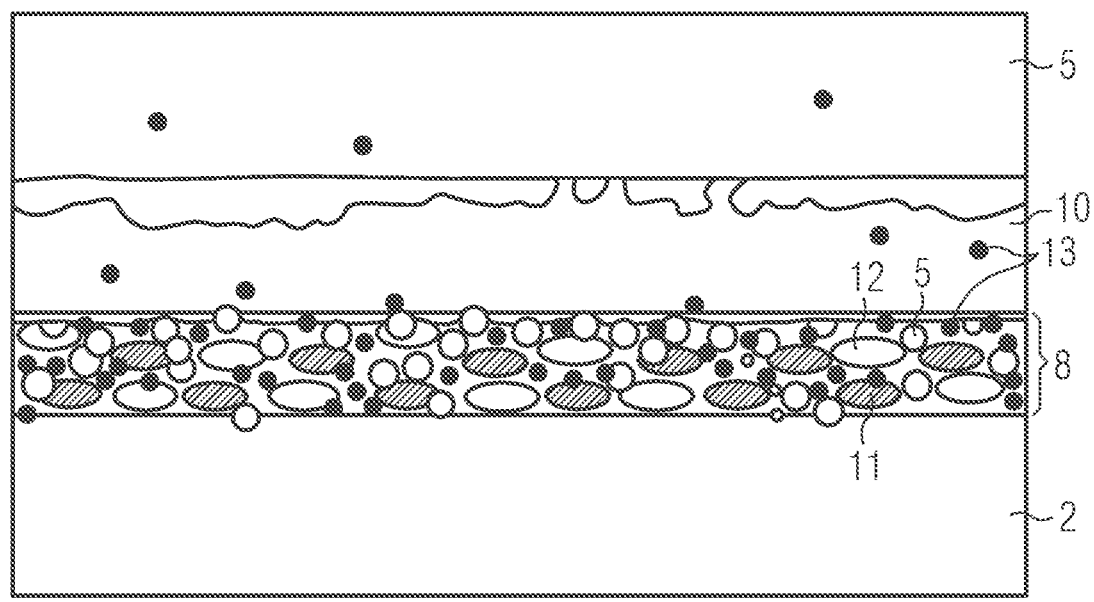
FIG. 2 shows an enlarged and more detailed view of a part of the electrolytic capacitor.

FIG. 2 shows an enlarged and more detailed view of a part of the electrolytic capacitor 1. In FIG. 1, the part shown in FIG. 2 is marked by rectangle A.

In FIG. 2, only the anode foil 2, the polymer layer 8 on the anode foil 2, the intermediate electrolyte 10 and the working electrolyte 5 are shown. For the sake of simplicity, the oxide layer 6 is not shown in FIG. 2.

FIG. 2 shows that the polymer layer 8 comprises PEDOT 11 and PSS 12. Moreover, the polymer layer 8 also comprises additives 13 from a polymer dispersion. The additives 13 also migrate into the intermediate electrolyte 10 and into the working electrolyte 5. Moreover, some of the intermediate electrolyte 10 is inside the polymer layer 8 and, to a low extent, the polymer layer 8 also comprises some of the working electrolyte 5. The working electrolyte 5 and the intermediate electrolyte 10 enter into the polymer layer 8 by diffusion.

FIG. 2 also shows that, at the boundary between the working electrolyte 5 and the intermediate electrolyte 10, the two electrolytes diffuse and mix with each other. Accordingly, the boundary between the working electrolyte 5 and the intermediate electrolyte 10 is not strict. Instead, to a certain extent, diffusion occurs at the boundaries when the working electrolyte 5 abuts the intermediate electrolyte 10. In a similar manner, the boundary between the intermediate electrolyte 10 and the polymer layer 8 is also not strict. Instead, the intermediate electrolyte 10 can migrate into the polymer layer 8. The working electrolyte 5 can also migrate into the polymer layer 8. However, as the working electrolyte 5 has to migrate through the intermediate electrolyte 10 before reaching the polymer layer 8, only a small amount of working electrolyte 5 can be found in the polymer layer 8.

In the following, a method of manufacturing the electrolytic capacitor 1 is described briefly. First, the anode foil 2, the cathode foil 3 and the separator 4 are wound to form the winding body. Then, a polymer dispersion is applied to the winding body to form the polymer layers 8 on the anode foil 2, the cathode foil 3 and the separator 4. Afterwards, the winding body is dried. In the next step, the intermediate electrolyte 10 is added to the winding body. After adding the intermediate electrolyte 10, the working electrolyte 5 is added to the winding body.

Table 3 shows a performance evaluation of various capacitors:

TABLE 3

|  | Intermediate electrolyte | Working electrolyte | ESR at 100 kHz at RT [mΩ] | Capacitance at 100 Hz [μF] | comment |
|---|---|---|---|---|---|
| Comparative Example 1 | — | Conventional electrolytic aluminum capacitor | 127 | 89.4 |  |
| Comparative Example 2 | — | GBL/ sulfolane | 21 | 89.6 | all failed over 100 V during forming process |
| Embodiment 1 | Example 1 | Example 1 | 17 | 89.5 |  |
| Embodiment 2 | Example 2 | Example 1 | 18 | 89.2 |  |
| Embodiment 3 | Example 3 | Example 2 | 17 | 89.3 |  |
| Embodiment 4 | Example 4 | Example 2 | 19 | 89.3 |  |

Each of the capacitors has a size of 25 mm×30 mm. Each of the capacitors has been evaluated at a voltage of 200 V.

The first comparative example is a conventional electrolytic aluminum capacitor which does not comprise an intermediate electrolyte. The second comparative example is a hybrid polymer capacitor which does not comprise an intermediate electrolyte 10 and which uses a working electrolyte 5 based on γ-butyrolactone and sulfolane solvents. The embodiments 1 to 4 are electrolytic hybrid polymer capacitors comprising a working electrolyte 5 and an intermediate electrolyte 10 according to the examples one to four given in Tables 1 and 2.

The equivalent serial resistance (ESR) at room temperature has been measured for each of the capacitors. The ESR has been measured at a frequency of 100 kHz. Table 3 shows the results of this measurement in its fourth column. The conventional electrolytic capacitor according to the first comparative example has a significantly higher ESR at room temperature compared to the second comparative example and to the capacitors according to embodiments 1 to 4.

Moreover, the capacitance of each of the capacitor at 100 Hz has been measured. The results are shown in the fifth column of Table 3. Each of the capacitors has approximately the same capacitance.

However, the second comparative example failed at voltages over 100 V. Only the embodiments 1 to 4 could successfully be operated at voltages up to 450 V and, simultaneously, provided a low ESR at room temperature.

Figure 3A:
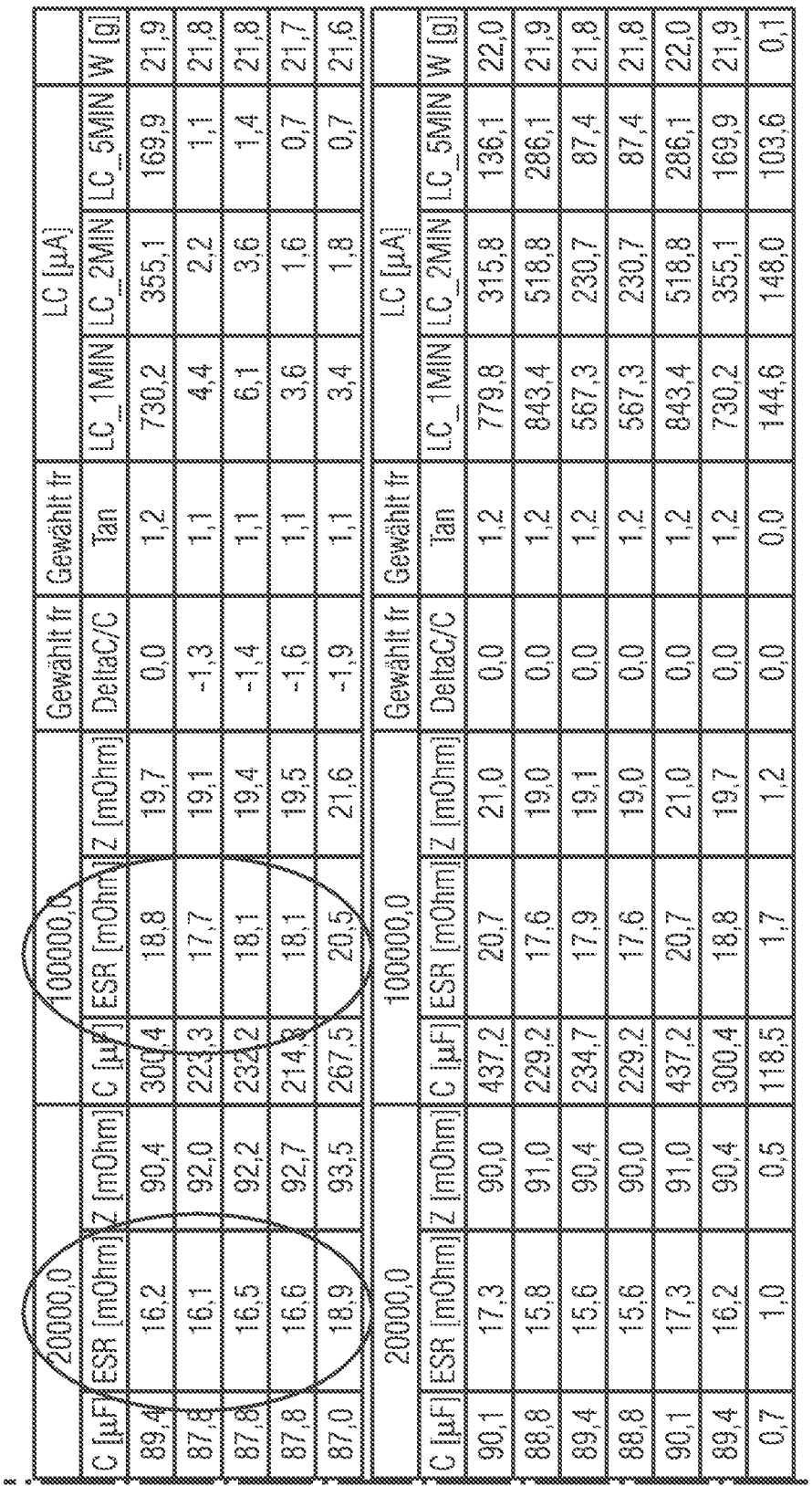
FIG. 3 (FIGS. 3Aa, 3Ab, 3Ba, 3Bb, 3Ca, and 3Cb) shows results of a continuous long-term test.

FIG. 3 shows the results of a continuous long-term test. During the test, three capacitors 1 have been evaluated. Each of the capacitors comprises an intermediate electrolyte 10 and a working electrolyte 5 containing ethylene glycol and other polyols. The test has been performed continuously over 3000 hours. During this time, a voltage of 200 V has been applied to each of the capacitors and a temperature of 105° C. has been maintained.

The ESR of each of the capacitors 1 has been measured at different frequencies. In particular, the ESR has been measured at frequencies of 100 Hz, 120 Hz, 1 kHz, 10 kHz, 20 kHz and 100 kHz. This measurement has been repeated at the start of the test, after 500 hours, after 1000 hours, after 2000 hours and at the end of the test after 3000 hours.

In the encircled columns, the average of the ESR measured for the capacitors 1 at 10 kHz, 20 kHz and 100 kHz is shown. It can be seen in FIG. 3 that the ESR does not significantly increase during the 3000 hour test time. Thus, the long-term test shows that the capacitors have a long lifetime. From this, it can be deduced that the intermediate electrolyte successfully prevented the working electrolyte from damaging the polymer layers.

Figures 4, 4A:
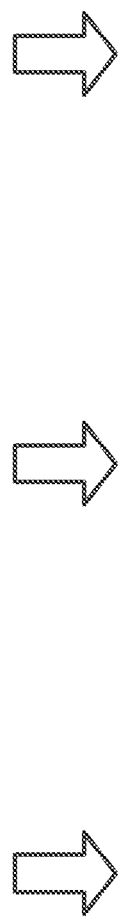
FIG. 4 (FIGS. 4A-4B) shows a comparison of the results of the long-term test performed with a hybrid polymer capacitors comprising an intermediate electrolyte and a working electrolyte to conventional aluminum electrolytic capacitors.

In FIG. 4, a table is shown which compares the results of the long-term test performed with the hybrid polymer capacitors 1 comprising an intermediate electrolyte 10 and a working electrolyte 5 to conventional aluminum electrolytic capacitors. The winding elements used for the aluminum electrolytic capacitors and the hybrid polymer capacitors are of the same size. The test has been performed at a temperature of 22° C. and a voltage of 200 V has been applied to each of the capacitors. Each of the evaluated capacitors has a capacitance of roughly 100 µF.

It can be seen in FIG. 4, that the hybrid electrolytic polymer capacitors 1 comprising an intermediate electrolyte 10 and a working electrolyte 5 have a lower ESR value at each of the frequencies 100 Hz, 120 Hz, 1 kHz, 10 kHz, 20 kHz and 100 kHz than the conventional electrolytic aluminum capacitors.

In particular, at a frequency of 100 Hz, the ESR of the capacitors 1 comprising an intermediate electrolyte 10 and a working electrolyte 5 ranges from 204.9 mΩ to 208.6 mΩ and the ESR of the conventional aluminum electrolytic capacitors is significantly higher, in particular ranging from 320.3 mΩ to 326.4 mΩ.

Further, at a frequency of 120 Hz, the ESR of the capacitors 1 comprising an intermediate electrolyte 10 and a working electrolyte 5 ranges from 173.7 mΩ to 178.3 mΩ and the ESR of the conventional aluminum electrolytic capacitors is significantly higher, in particular ranging from 289.0 mΩ to 295.3 mΩ.

Further, at a frequency of 1 kHz, the ESR of the capacitors 1 comprising an intermediate electrolyte 10 and a working electrolyte 5 ranges from 36.1 mΩ to 38.6 mΩ and the ESR of the conventional aluminum electrolytic capacitors is significantly higher, in particular ranging from 147.5 mΩ to 153.0 mΩ.

Further, at a frequency of 20 kHz, the ESR of the capacitors 1 comprising an intermediate electrolyte 10 and a working electrolyte 5 ranges from 15.6 mΩ to 17.3 mΩ and the ESR of the conventional aluminum electrolytic capacitors is significantly higher, in particular ranging from 127.4 mΩ to 132.4 mΩ.

Further, at a frequency of 100 kHz, the ESR of the capacitors 1 comprising an intermediate electrolyte 10 and a working electrolyte 5 ranges from 17.9 mΩ to 20.7 mΩ and the ESR of the conventional aluminum electrolytic capacitors is significantly higher, in particular ranging from 124.3.0 mΩ to 129.7 mΩ.

Overall, at higher frequencies, i.e., at frequencies of 1 kHz and above, the hybrid polymer capacitor 1 has even more benefits over the conventional aluminum electrolytic capacitor. At frequencies of 1 kHz and above, the ESR is determined by the metallic resistance. At low frequencies, i.e., at frequencies below 300 Hz, the ESR is driven by the oxide resistance. The oxide resistance is the same for the conventional aluminum electrolytic capacitors and the hybrid polymer capacitors comprising an intermediate electrolyte and a working electrolyte.

I claim:

1. An electrolytic capacitor comprising:
   an anode foil;
   a cathode foil;
   a working electrolyte arranged between the anode foil and the cathode foil;
   a polymer layer arranged on the anode foil, wherein the polymer layer comprises poly(3,4-ethylenedioxythiophene) polystyrene sulfonate (PEDOT:PSS); and
   an intermediate electrolyte arranged between the polymer layer and the working electrolyte, wherein the intermediate electrolyte is different from the working electrolyte with respect to its composition.

2. The electrolytic capacitor according to claim 1, wherein the intermediate electrolyte comprises a polyol and a conducting salt.

3. The electrolytic capacitor according to claim 2, wherein the polyol is one of glycerol, sugar alcohol, polyvinyl alcohol or a mixture of glycerol, sugar alcohol and/or polyvinyl alcohol.

4. The electrolytic capacitor according to claim 2, wherein an amount of the polyol in the intermediate electrolyte is in a range of 3 weight-% to 80 weight-% inclusive.

5. The electrolytic capacitor according to claim 2, wherein the conducting salt contains at least one of carboxylic acid and/or dicarboxylic acid as anions, and at least one of ammonium and/or amines as cations.

6. The electrolytic capacitor according to claim 2, wherein an amount of the conducting salt in the intermediate electrolyte is in a range of 0.01 weight-% to 8 weight-% inclusive.

7. The electrolytic capacitor according to claim 1, wherein the intermediate electrolyte comprises diethylene glycol in a range of 1 weight-% to 40 weight-% and/or propylene glycol in a range of 1 weight-% to 40 weight-%.

8. The electrolytic capacitor according to claim 1, wherein the working electrolyte comprises a solvent and at least 0.01 weight-% conducting salt.

9. The electrolytic capacitor according to claim 8, wherein the solvent contains at least one of ethylene glycol, diethylene glycol or propylene glycol.

10. The electrolytic capacitor according to claim 8, wherein the conducting salt in the working electrolyte contains at least one of carboxylic acid, dicarboxylic acid, ammonium or aromatic nitro compounds with one or more nitro groups.

11. The electrolytic capacitor according to claim 8, wherein the working electrolyte comprises a polyol solved in the solvent, the polyol is at least one of glycerol, sugar alcohol, polyvinyl alcohol or a mixture of glycerol, sugar alcohol and polyvinyl alcohol, and/or wherein the working electrolyte comprises at least one of polyethylene glycol, polyvinylpirrolydone, or polyalkylene glycol and/or derivatives from polyalkylene glycol.

12. The electrolytic capacitor according to claim 1, wherein the working electrolyte comprises:
 a) 40-85 weight-% inclusive ethylene glycol;
 b) 0.001-5.0 weight-% inclusive p-nitrobenzoic acid;
 c) 0.001-0.5 weight-% inclusive ammonium hypophosphite;
 d) 1-10 weight-% inclusive ammonium pentaborate;
 e) 1-10 weight-% inclusive polyethylene glycol;
 f) 10-50 weight-% inclusive of a composition comprising diammonium salt of 2-methyl-nonandi acid, 2,4-dimethyl-4-methoxy-carbonyl-undecandi acid, 2,4,6-trimethyl-4,6-dimethoxy-carbonyl-tridecandi acid and 8,9-dimethyl-8,9-dimethoxy-carbonyl-hexadecandie acid; and
 g) 1-10 weight-% inclusive ammonium-methylbenzoat.

13. The electrolytic capacitor according to claim 1, wherein the polymer layer comprises PEDOT:PSS.

14. The electrolytic capacitor according to claim 1, wherein the working electrolyte contains γ-butyrolactone and/or sulfolane.

15. The electrolytic capacitor according to claim 1, wherein the cathode foil comprises an oxide layer on a surface facing towards the working electrolyte.

16. The electrolytic capacitor according to claim 15, wherein the oxide layer has a thickness in a range of 1 nm to 10 nm inclusive.

17. The electrolytic capacitor according to claim 1, wherein the working electrolyte comprises ethylene glycol and the intermediate electrolyte is free of ethylene glycol.

18. An electrolytic capacitor comprising:
 an anode foil;
 a cathode foil;
 a working electrolyte arranged between the anode foil and the cathode foil;
 a polymer layer arranged on the anode foil; and
 an intermediate electrolyte arranged between the polymer layer and the working electrolyte, and
 wherein the working electrolyte comprises ethylene glycol and the intermediate electrolyte is free of ethylene glycol.

* * * * *

UNITED STATES PATENT AND TRADEMARK OFFICE
CERTIFICATE OF CORRECTION

| | |
|---|---|
| PATENT NO. | : 11,049,662 B2 |
| APPLICATION NO. | : 16/648476 |
| DATED | : June 29, 2021 |
| INVENTOR(S) | : Laszlo Dobai |

It is certified that error appears in the above-identified patent and that said Letters Patent is hereby corrected as shown below:

In the Claims

In Claim 6, Column 10; Lines 59 delete "0.01 weight" insert --0.1 weight--

In Claim 8, Column 10; Line 66 delete "0.01" insert --0.1--

Signed and Sealed this
Seventh Day of September, 2021

Drew Hirshfeld
*Performing the Functions and Duties of the
Under Secretary of Commerce for Intellectual Property and
Director of the United States Patent and Trademark Office*